United States Patent Office 2,813,234
Patented Nov. 12, 1957

2,813,234

MOTOR CONTROL SYSTEM

Robert W. Egglestone, Cheektowaga, N. Y., assignor to Westinghouse Electric Corporation, East Pittsburgh, Pa., a corporation of Pennsylvania Application August 18, 1955, Serial No. 529,303

9 Claims. (Cl. 318—6)

My invention relates generally to motor control systems, and it has reference in particular to a control system for a motor in a core-type reel drive or the like.

Many motor applications require that constant horsepower output be maintained. For example, it is often desired that constant tension be maintained in material being wound onto a reel. When the reel is driven by its core, this requires the driving speed of the reel to decrease in ratio to the build-up of the coil on the reel. It also requires the driving torque to increase in accordance with the build-up. The practice in the past has generally been to use an adjustable D. C. motor for the reel drive. Since it is desirable that the tension in the strip of material being wound on the reel remain constant during build-up by regulating the armature current of the reel motor through variation of the field excitation, it is possible to obtain a constant horsepower input to the reel motor and hence a constant tension in the strip being wound onto the reel. This system is limited to a speed range within which it is possible to build a D. C. motor which is regulated by field control and to the range of the regulator regulating the armature current by controlling the field excitation. A variable speed motor covering the speed range by field control has a practical limitation of about 5 to 1. This also corresponds to a practical limit of a magnetic amplifier regulator for regulating the motor field. For core-driven reels with build-ups in excess of a 5 to 1 ratio, it has been necessary to use rider arms to measure the diameter of the reel or resort to some other expedient, such as a loop regulator. Neither of these is very desirable since it requires additional mechanical equipment.

Generally stated, it is an object of my invention to provide in a direct current motor drive for extending the speed range of a motor by using a range booster electrically and mechanically connected therewith.

Generally stated, it is also an object of my invention to provide in a core-type reel drive for obtaining a coil build-up in excess of the usual 5 to 1 value which is obtainable by field control alone.

More specifically, it is an object of my invention to provide in a control system for a reel motor for maintaining a constant strip tension and converting part of the reel motor torque to armature voltage so as to extend the range of coil build-up obtainable.

A further object of my invention is to provide in a control system for a motor for using a dynamoelectric machine connected in driving relation therewith as a range booster for varying the armature voltage of the motor so as to extend the speed range thereof.

Another object of my invention is to provide in a reel drive for converting excess torque developed by a reel motor into speed.

Yet, another object of my invention is to provide in a drive for using a dynamoelectric machine having an armature connected in series circuit with the motor armature and mechanically connected therewith for varying the armature voltage of the motor to thereby extend the speed range during operation.

It is also an object of my invention to provide in a core-type drive for using a drag booster generator for extending the build-up range of the reel while operating under constant tension conditions.

Another important object of my invention is to provide in a core-type reel drive for using a drag booster generator driven by the reel motor for varying the armature voltage of the reel motor and providing tapered tension during winding.

Other objects will, in part, be obvious and will, in part, be explained hereinafter.

In practicing my invention in accordance with one of its embodiments, a reel motor driving a core-type reel has its field excitation controlled by a current regulator so as to maintain a constant value of armature current during a winding operation. The armature is energized from a reel generator having an output voltage in accordance with the speed of the strip of material being wound. A dynamoelectric machine is operated as a drag booster generator having its armature driven by the reel motor and connected in series with the reel motor and reel generator armatures, and is provided with a fixed field excitation. An IR booster generator is also connected in series with the armatures having a fixed field to compensate for IR losses and a variable field energized from the drag booster generator to compensate for losses in the drag generator and reel motor, and obtain a taper in the strip tension as the coil increases in diameter.

For a more complete understanding of the nature and scope of my invention, reference may be made to the following detailed description which may be read in connection with the accompanying drawings, in which.

Figure 1:
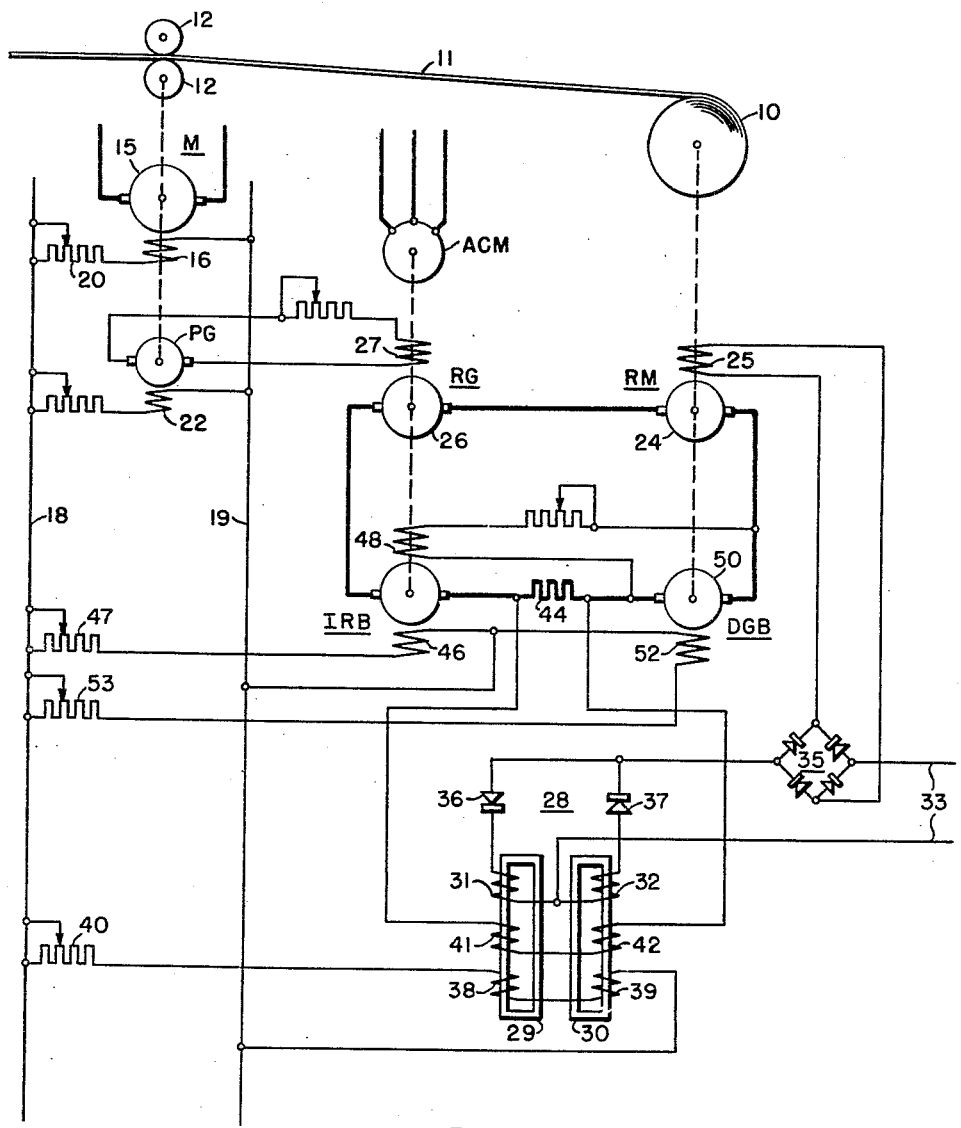
Figure 1 is a schematic diagram of a core-type reel drive embodying the invention in one of its forms.

Referring to Fig. 1 of the drawings, the reference numeral 10 denotes a reel of the core type for winding a strip of material 11 which is proceeding from a work device, such as a mill stand, which is represented by the rolls 12. The rolls 12 are driven in any suitable manner being, for example, connected in driving relation with a mill motor M having an armature 15 energized from a suitable source of electrical energy, and a field winding 16 connected to a source of control voltage represented by the conductors 18 and 19 through control means, such as a rheostat 20. The motor M is provided with a pilot generator PG having a field winding 22 energized from the conductors 18 and 19 for producing a voltage proportional to the speed of the strip 11.

The reel 10 is driven by a reel motor RM having an armature 24 and a field winding 25. The armature 24 is supplied with electrical energy from a reel generator RG having an armature 26 connected in a loop-circuit relation with the armature 24 and a field winding 27 which is energized in accordance with the speed of the strip 11 being, for example, energized from the pilot generator PG. The armature 26 is driven by an alternating-current motor ACM.

In order to provide for maintaining a constant tension in the strip 11, excitation of the field winding 25 of the reel motor is controlled by a current regulator 28. The regulator 28 comprises a magnetic amplifier having cores 29 and 30 with load windings 31 and 32 thereon connected in parallel circuit relation between a source of alternating current 33 and a full-wave rectifier bridge circuit 35. Rectifier devices 36 and 37 connected in series with the windings 31 and 32, respectively, provide for unidirectional energization of these windings during opposite half cycles. The field winding 25 is connected to the output circuit of the bridge circuit 35. Pattern windings 38 and 39 are provided on the cores 29 and 30, and are connected to the conductors 18 and 19 through a rheostat 40 to determine the value of current in the armature circuit. Control windings 41 and 42 are provided on the cores 29 and 30 energized in accordance with the armature current of the reel motor being, for example, connected across a resistor 44 in the armature circuit. The pattern windings 38 and 39 are differential with respect to the load windings 31 and 32, while the control windings 41 and 42 are cumulative in their action.

An IR booster generator IRB is connected in the loop circuit having a fixed field winding 46 energized from the conductors 18 and 19 through a rheostat 47 to provide for compensating for the resistance drop of the loop circuit. A field winding 48 is also provided on the booster generator IRB.

In order to convert a part of the torque of the reel motor RM to armature voltage or speed, a drag generator booster DGB is provided having an armature 50 driven by the reel motor RM and connected in the loop circuit therewith. The drag generator booster is provided with a fixed field winding 52 energized from the conductors 18 and 19 through a rheostat 53 so as to develop a drag load on the reel motor RM which is of constant torque independent of the speed of the reel motor.

To illustrate how this system works, we may assume that the reel 10 has a build-up ratio of 8 to 1, and that the generator RG is operating at 115 volts, and that the drag generator booster has its fixed field 52 energized so as to obtain 115 volts at the maximum reel speed corresponding to an empty reel, and would, therefore, have a generated voltage of only 14.4 volts when the reel is at minimum speed corresponding to the full reel condition. The IRB booster has its field excitation set to compensate only for the IR drop in the armature loop circuit. Therefore, the voltage appearing across the armature of the reel motor RM will be 230 volts for the empty reel at maximum reel speed, and 129.4 volts for the full reel for minimum reel speed. This gives a voltage range across the reel motor armature of 1.78 to 1. It will, therefore, be necessary to have a field range on the reel motor RM of only 4½ to 1 so that the total field range and voltage range will equal 8 to 1 required for the 8 to 1 value of the reel build-up.

Figure 3:
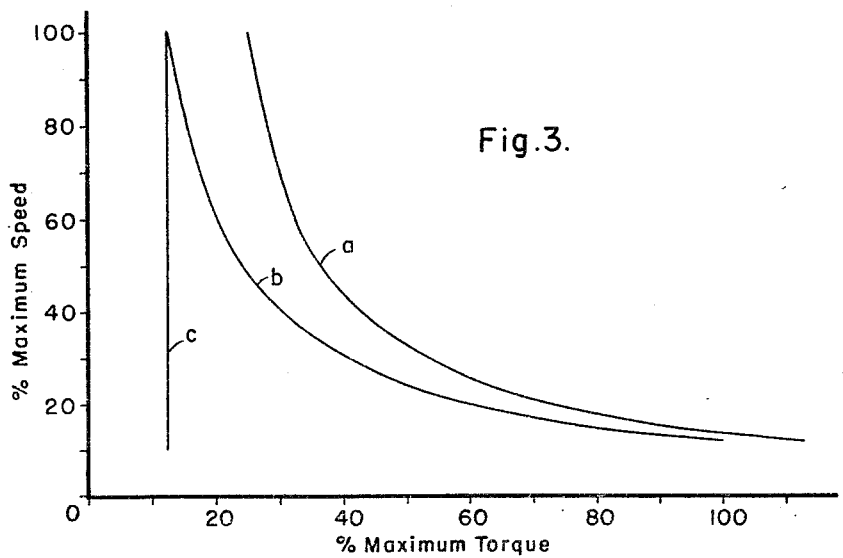
Fig. 3 illustrates torque characteristics of the reel driven shown in Fig. 1.

Curves a and b of Fig. 3 show the operating characteristics of the reel drive, namely, the speed torque curve of the reel motor RM and the reel 10 for the above-described conditions, while the curve c shows the speed torque curve of the drag generator booster. Since the voltage of the drag generator DGB is equal to one-half of the armature voltage across the reel motor at maximum speed, the torque required to drive this drag generator will be 50% of the torque developed by the motor. Therefore, the constant torque developed by the drag generator will be equal to the torque required for the reel at empty reel build-up. Since maximum torque from the reel motor is required for full reel conditions, we will consider this torque to be 100%. On this basis, we require 12½% torque for empty reel or ⅛ of maximum torque. This corresponds to the 8 to 1 build-up of the reel with the drag generator booster DGB requiring equal torque under empty reel conditions. The reel motor RM must, therefore, develop 25% torque at maximum reel speed, that is, at 100% speed. At full reel, the torque required to be developed by the motor RM will be 100% torque for the reel plus 12½% torque for the drag generator booster for a total of 112½% torque for the combination. The reel motor, therefore, develops 112½% torque at full field and 25% torque at weak field. This is a ratio of torque of 4.5 to 1. Since the armature current is constant, the speed range by field control will also be 4.5 to 1. The drag generator booster actually converts excess torque developed by the reel motor into voltage in the armature circuit, which effectively increases the speed of the reel motor, thus providing a torque to speed conversion.

Figure 2:
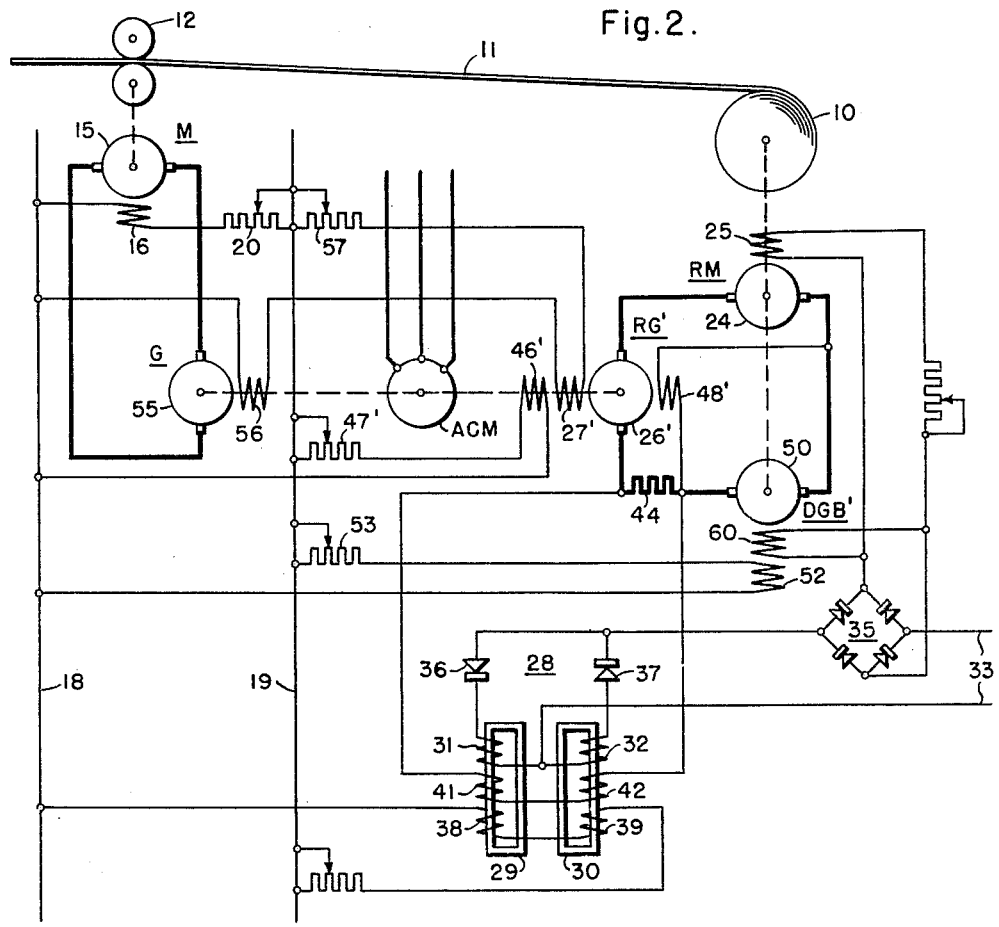
Fig. 2 is a schematic diagram of a core-type reel drive embodying the invention in a different form.

Referring to Fig. 2, the reference numeral 10 again represents a reel for winding a strip of material 11 proceeding from the rolls 12 of a rolling mill driven by a motor M having an armature 15 which is energized from a main generator G having an armature 55 connected in a loop circuit with the motor armature 15 and having a field winding 56. The motor M has a field winding 16 energized from conductors 18 and 19 through control means represented by the rheostat 20.

The reel 10 is driven by a reel motor RM having an armature 24 and a field winding 25. The field winding 25 is energized under the control of a current regulator 28 which connects the field winding to an alternating-current source 33 through a rectifier bridge circuit 35 for controlling the excitation in accordance with the armature current of the reel motor. The current regulator 28 having control windings 41 and 42, is connected across a resistor 44 in the armature circuit of the reel motor. The armature 24 is energized from a reel generator RG' having an armature 26' connected in loop-circuit relation with the armature 24 of the reel motor and having a plurality of field windings 27', 48' and 46'. The field winding 27' corresponds to the field winding 27 of Fig. 1 and is connected to the conductors 18 and 19 in series with the field winding 56 of the main generator G so as to be energized in accordance with the speed of the mill. A rheostat 57 provides for varying the excitation of these windings and the speed of the mill. An alternating-current motor ACM is provided for driving both the main generator G and the reel generator RG'. Field winding 46' is energized from the conductors 18 and 19 through a rheostat 47' so as to compensate for the IR drop in the armature circuit. The field winding 48' is connected across the armature 50 of the drag generator booster DGB' which is driven by the reel motor RM and connected in loop circuit therewith. The drag generator booster DGB' has a field winding 52 connected to the conductors 18 and 19 through a rheostat 53 so as to provide a fixed excitation and has an additional field winding 69 which is energized in parallel with the field winding 25 of the reel motor in opposition to the field winding 52 so as to neutralize the effect of the field winding 52 at minimum speed to provide a zero output voltage for the drag generator booster at minimum speed. This decreases the size of the reel motor and narrows the field range for which the reel motor is required to operate.

Assuming that the drive is to operate over a 12 to 1 build-up range, the reel generator RG will have an armature voltage of 80 volts corresponding to the maximum speed. The drag generator booster DGB' will have 160 volts armature voltage at empty reel. Because of the differential field 60, it will operate from zero voltage at minimum speed to 160 volts at maximum speed. The armature voltage across the reel motor RM, therefore, varies from 80 volts to 240 volts for a ratio of 3 to 1. A range of field control on the field winding 25 of 4 to 1, therefore, provides an overall build-up range of 12 to 1.

When the main drive motor M is operating at half speed, the voltage of the main generator G and the reel generator RG' will be at one-half, so that the voltage of the reel generator RG' will be 40 volts. At empty reel, the field excitation of the reel motor still corresponds to the weak field position or maximum speed. This maximum speed, however, would now be only 50% because of the line speed being 50%. The drag generator booster DGB' now develops 80 volts, and the voltage across the reel motor RM is, therefore, 120 volts. At full reel speed, the excitation would be full field on the reel motor, and the drag generator voltage would be zero. Thus, the voltage across the armature of the reel motor RM would vary from 40 to 120 volts. This is a 3 to 1 ratio in voltage and requires only a 4 to 1 ratio in field excitation in order to obtain the 12 to 1 value of reel build-up.

From the above description and the accompanying drawings, it will be apparent that I have provided in a simple and effective manner for increasing the operating range of a reel drive without requiring an excessive range of field control. This results in more stable operation of the motor and a less expensive motor since no special field design is required.

Since certain changes may be made in the above-described construction and different embodiments in the invention may be made without departing from the spirit and scope thereof, it is intended that all the matter contained in the above description and shown in the accompanying drawings shall be considered as illustrative and not in a limiting sense.

I claim as my invention:

1. In a drive, a motor having a field winding and an armature for connection in driving relation with a load, generator means connected to supply electrical energy to the armature, means including a regulator responsive to the armature current controlling energization of the field winding to maintain a constant value of armature current, and a drag generator having an armature driven by the motor connected in circuit with the motor armature and having only a fixed field excitation.

2. In combination, a motor having an armature and a field winding, generator means connected in loop circuit relation with the armature, a regulator controlling energization of the field winding to maintain a constant value of armature current, and a booster dynamoelectric machine having an armature connected mechanically with the motor armature and connected in said loop circuit therewith and having a field winding energized from a separate voltage source so that the armature voltage is independent of the regulator.

3. In a reel drive, a motor having an armature connected in driving connection with a reel for winding a strip of material proceeding from a work device and having a field winding, a reel generator having an armature connected in a loop circuit with the motor armature and having a field winding, a regulator controlling energization of the motor field winding to maintain a substantially constant value of armature current, a drag generator having a field winding energized from a source of control voltage and having an armature connected in loop circuit relation with the motor and generator armatures and driven by the motor, and a booster generator driven by the reel generator having an armature connected in the loop circuit and a field winding energized in accordance with the armature voltage of the drag generator.

4. A drive comprising, a motor having a field winding and an armature connected to a source of electrical energy, and a range booster having an armature connected mechanically with the motor armature and connected electrically in series circuit therewith, said range booster having only a fixed field excitation so as to vary the voltage applied to the motor armature over the speed range of the motor.

5. A reel drive comprising, a reel motor having an armature connected in driving relation with a reel and having a field winding, a generator having an armature connected in loop relation with the motor armature and having a field winding energized in accordance with the speed of a strip of material being wound on the reel, a drag generator having a field winding energized from a source of control voltage and an armature driven by the motor armature and connected in the loop circuit therewith, a regulator connected to effect energization of the motor field winding to maintain a substantially constant value of armature current in the loop circuit, and a booster generator having an armature connected in the loop circuit and a field winding energized from a fixed source to compensate for IR losses.

6. In a drive for a reel handling a strip of material from a work device, means producing a voltage in accordance with the speed of the work device, a motor having a field winding and an armature connected in driving relation with the reel, a reel generator having an armature connected in a loop circuit with the motor armature and having a field winding energized in accordance with said voltage, a regulator responsive to the motor armature current to regulate the energization of the motor field winding to maintain a constant value of armature current, a drag generator having an armature connected in the loop circuit with the motor armature and connected in driven relation therewith and having a field winding connected to a source of control voltage, and a booster generator having an armature connected in driven relation with the reel generator, and having field windings energized respectively from a source of control voltage and in accordance with the armature voltage of the drag generator.

7. In a reel drive, a reel motor having an armature connected in driving relation with the reel and having a field winding, a reel generator having an armature connected in loop circuit relation with the motor armature and a plurality of field windings, a drag generator having an armature connected in driven relation and in loop circuit relation with the motor armature, circuit means connecting one of the plurality of reel generator field windings across the armature of the drag generator, and a regulator operable to regulate energization of the reel motor field winding in accordance with the current in the loop circuit to maintain a constant value of current.

8. In a reel drive, a reel motor having an armature connected in driving relation with the reel and having a field winding, a reel generator having an armature connected in loop relation with the motor armature and having a plurality of field windings, circuit means connecting one of said plurality of windings to a source of control voltage, a drag generator having an armature connected in the loop circuit and in driven relation with the motor armature and having a plurality of field windings, circuit means connecting one of said generator windings across the drag generator armature, circuit means connecting one of the drag generator windings to a source of control voltage, and means including a regulator responsive to the current in the loop circuit regulating energization of the reel motor field winding to regulate for a constant value of armature current and effecting energization of another of the drag generator field windings differentially with respect to said one.

9. In a reel drive, a reel motor having an armature connected in driving relation with the reel and having a field winding, a main motor having an armature connected in driving relation with a work device supplying a strip of material to the reel and having a field winding energized from a source of control voltage, a main generator having an armature connected in loop circuit with the armature of the main motor and having a field winding, a reel generator having an armature connected in driven relation with the armature of the main generator and in loop circuit with the armature of the reel motor, said reel generator having a plurality of field windings, a drag generator having a field winding and an armature connected in driven relation with the reel motor armature and in loop circuit relation therewith, a regulator responsive to the reel motor armature current for effecting energization of the reel motor field winding to maintain a constant value of armature current and effecting energization of one of the field windings of the drag generator in a direction to increase the armature voltage of the reel motor, circuit means connecting another of the drag generator field windings to a source of control voltage differentially with respect to said one, circuit means connecting the main generator field winding and one of the reel generator field windings in series to a variable voltage source, and circuit means connecting another of the reel generator field windings to be energized in accordance with the armature voltage of the drag generator.

References Cited in the file of this patent

UNITED STATES PATENTS

| | | |
|---|---|---|
| 2,186,843 | Shoults | Jan. 9, 1940 |
| 2,454,166 | Harding | Nov. 16, 1948 |